Dec. 6, 1938.   J. VERRE   2,139,213
SUNGLASS
Filed July 21, 1937

INVENTOR.
John Verre

Patented Dec. 6, 1938

2,139,213

UNITED STATES PATENT OFFICE 2,139,213

SUNGLASS

John Verre, Los Angeles, Calif.

Application July 21, 1937, Serial No. 154,917

2 Claims. (Cl. 88—41)

The primary object of this invention is to provide a sun glass that will afford better protection from the intense glare of the sun's rays.

A further object is to provide an improved composite ophthalmic lens and sun glasses that will not only aid and correct vision, but will protect the eyes from the intense glare of the sun's rays.

The sun glass as hereinafter described is an ophthalmic lens which has been modified by the provision of an opaque portion and a stippled portion so as to be suitable for the several conditions under which it will be worn.

Referring to the drawing.

Figure 1:
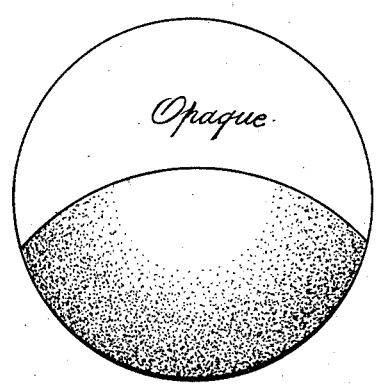
Fig. 1 is a front elevation of an ophthalmic lens the upper portion of which is opaque, the lower covered by black spots of varying density.
Figure 2:
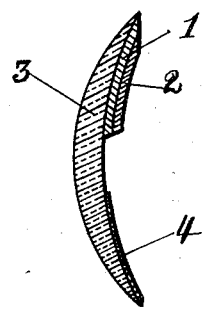
Fig. 2 is a side elevation in section of the ophthalmic lens of Fig. 1.

Referring now in greater detail to the several figures, the ophthalmic lens 3 is opaquely screened in its upper portion. This screen preferably takes the form of a crescent, the extremities of which extend below the horizontal meridian. The screen is preferably composed of two coatings secured to the rear of the lens. The coating 1 in Fig. 2 is flesh colored and is affixed directly to the rear of the lens and is covered over by a second coating 2, which may be black paint or varnish. However any dark colored material may be used.

The lower portion of the screen, below the opaque crescent is stippled or covered by a spot screen 4, Fig. 2, comprising opaque spots graduated in density from the edge of the lens towards the central portion. The central portion through which the main line of vision extends is substantially round and is left clear.

Although I have shown and particularly described the preferred embodiment of my invention, it is obvious that modifications may be made without departing from the spirit of the invention as set forth in the appended claims.

I claim:—

1. An ophthalmic lens having on the upper portion of one face an opaque screen and on the lower portion a screen of opaque spots of decreasing density extending from the edge of said lens towards the central portion, said central portion through which the main line of vision extends remaining substantially clear.

2. An ophthalmic lens having on its upper portion a crescent shaped skin colored opaque screen backed by black varnish, the ends of the crescent extending below the horizontal meridian, and on its lower portion a screen of opaque spots graduated in density from the edge of the lens towards the center, leaving clear a space around the center on the main line of vision.

JOHN VERRE.